US012587063B2

(12) United States Patent
Koga

(10) Patent No.: US 12,587,063 B2
(45) Date of Patent: Mar. 24, 2026

(54) ROTATION DRIVE DEVICE

(71) Applicant: TAKANO CO., LTD., Nagano (JP)

(72) Inventor: Yoshiro Koga, Kamiina-gun (JP)

(73) Assignee: TAKANO CO., LTD., Kamiina-gun (JP)

( * ) Notice: Subject to any disclaimer, the term of this patent is extended or adjusted under 35 U.S.C. 154(b) by 384 days.

(21) Appl. No.: 18/020,792

(22) PCT Filed: Aug. 6, 2021

(86) PCT No.: PCT/JP2021/029293
§ 371 (c)(1),
(2) Date: Feb. 10, 2023

(87) PCT Pub. No.: WO2022/034860
PCT Pub. Date: Feb. 17, 2022

(65) Prior Publication Data
US 2024/0039366 A1     Feb. 1, 2024

(30) Foreign Application Priority Data

Aug. 11, 2020     (JP) ................................. 2020-135549

(51) Int. Cl.
H02K 7/08 (2006.01)
H02K 1/2706 (2022.01)
(52) U.S. Cl.
CPC ........... H02K 7/088 (2013.01); H02K 1/2706 (2013.01)
(58) Field of Classification Search
CPC ........ H02K 7/088; H02K 1/27; H02K 1/2706; H02K 1/272; H02K 1/274; H02K 1/278; H02K 5/173; H02K 1/276
See application file for complete search history.

(56) References Cited

U.S. PATENT DOCUMENTS 6,006,792  A     12/1999  Krumm et al.
6,006,793  A     12/1999  Krumm et al.
(Continued)

FOREIGN PATENT DOCUMENTS

DE          10152502 A1 *  5/2003   ............... H02K 1/17
DE     202017103424 U1 *  8/2017
(Continued)

OTHER PUBLICATIONS

U.S. Appl. No. 18/020,792, filed Feb. 26, 2025_DE_202017103424_U1_H.pdf (Year: 2025).*
(Continued)

*Primary Examiner* — Christopher M Koehler
*Assistant Examiner* — Ahmed F Seck
(74) *Attorney, Agent, or Firm* — Birch, Stewart, Kolasch & Birch, LLP

(57)          ABSTRACT

A rotation drive device includes a movable body portion having a rotor yoke formed in a ring shape and a ring-shaped rotor magnet in which a plurality of magnetic poles are arranged along a circumferential direction of an outer peripheral portion of the rotor yoke; a fixed body portion in which a plurality of stator core portions, each of which faces an outer peripheral portion of the movable body portion, are arranged in an inner peripheral portion of a stator formed in a ring shape at predetermined intervals along the circumferential direction; and a movable body support portion formed of a plurality of support rollers rotatably supporting the movable body portion by being fixed in position with respect to the stator and bringing a roller peripheral surface into contact with the outer peripheral portion or an inner peripheral portion of the movable body portion.

19 Claims, 12 Drawing Sheets

(56)     References Cited

U.S. PATENT DOCUMENTS

| | | | | |
|---|---|---|---|---|
| 2010/0013338 A1 * | 1/2010 | Takahashi | ............. | H02K 1/276 |
| | | | | 29/598 |
| 2018/0287459 A1 * | 10/2018 | Huang | .................. | B64U 30/20 |
| 2020/0014290 A1 * | 1/2020 | Bikmukhametov | ......................... | |
| | | | | H02K 19/103 |

FOREIGN PATENT DOCUMENTS

| | | | | | |
|---|---|---|---|---|---|
| EP | 1104077 | A2 * | 5/2001 | ............ | B60L 15/007 |
| JP | 11-117147 | A | 4/1993 | | |
| JP | 10-271741 | A | 10/1998 | | |
| JP | 11-107129 | A | 4/1999 | | |
| JP | 2005-121172 | A | 5/2005 | | |
| JP | 3646205 | B2 * | 5/2005 | | |
| JP | 2009-177980 | A | 8/2009 | | |
| WO | WO-2011065893 | A1 * | 6/2011 | ............. | H02K 1/278 |
| WO | WO-2017142501 | A1 * | 8/2017 | ............. | H02K 21/12 |

OTHER PUBLICATIONS

U.S. Appl. No. 18/020,792, filed Feb. 26, 2025_EP_1104077_A2_H.pdf (Year: 2025).*
DE_10152502_A1_-_Translation.pdf (Year: 2025).*
JP2004039822A_Translation.pdf (Year: 2025).*
WO_2017142501_A1_-_Translation.pdf (Year: 2025).*
WO-2011065893-A1_-_Translation.pdf (Year: 2025).*
International Search Report (PCT/ISA/210), issued in PCT/JP2021/029293, dated Oct. 5, 2021.

* cited by examiner

ROTATION DRIVE DEVICE

BACKGROUND

Technical Field

The present invention relates to a rotation drive device including a fixed body portion having a stator coil wound around a plurality of stator core portions and a movable body portion having a rotor magnet in which a plurality of magnetic poles are arranged.

Discussion of the Related Art

In general, rotation drive devices (servomotors) used in automatic weaving machines, and the like, need to perform control such as rotation start, rotation stop, rotation speed switching, rotation direction switching, and the like frequently and with high-speed response during rotation. Thus, it is required to reduce the moment of inertia as much as possible by reducing the weight of the rotor (movable portion), and a unique special structure is required because it is necessary to manipulate the thread.

Conventionally, direct electromagnetic drive rotary selvage devices for weaving machines disclosed in Patent Literatures 1 and 2 are known as rotation drive devices used for such applications. The direct electromagnetic drive rotary selvage device for weaving machines disclosed in Patent Literature 1 aims to solve the following problem. An appropriate bearing device which enables a relatively narrow structure of the selvedge device and can be incorporated into the selvedge device with a simple structure and at a low cost has to be found for a leno disk. In this case, the drive device has to be equipped with an angle-of-rotation measurement system, and the electromagnetic drive device, the bearing device, and the angle-of-rotation measurement system are sufficiently protected against contamination. Specifically, Patent Literature 1 discloses a direct electromagnetic drive rotary selvage device for weaving machines in which a leno disc is the rotor of the electromagnetic drive device, the outer race of the rolling bearing is non-rotatably fixed to the leno disk, and a centering device coaxially disposed about the rotor center axis and carrying the inner race of the rolling bearing is provided in the stator housing.

Further, a direct electromagnetic drive rotary selvage device for weaving machines disclosed in Patent Literature 2 aims to provide a narrow rotary selvage device in which a leno disk is the rotor of the direct electromagnetic drive device, and a magnetic flux different from the radial magnetic flux is generated between the rotor and the stator. Specifically, Patent Literature 2 discloses a direct electromagnetic drive rotary selvage device for weaving machines in which two thread ends are arranged symmetrically around the central axis, a rotationally-supported leno disk is provided for guiding leno yarn supplied from the first and second leno bobbins by respective thread ends, the leno disk forms the rotor of the electromagnetic drive device, the stator is housed in a housing connectable to the weaving machine, and an axial magnetic flux exists between the rotor and the stator.

Patent Document 1: Japanese Patent Application Publication No. 11-107129

Patent Document 1: Japanese Patent Application Publication No. 11-117147

SUMMARY OF THE INVENTION

However, the above-described conventional rotation drive device (direct electromagnetic drive rotary selvage device for weaving machines) has the following problems.

A first problem is that since the rotor is supported by a dedicated rolling bearing formed to have a large diameter as a metal component, some components such as the outer race of the rolling bearing that rotates integrally with the rotor also become larger and heavier. Thus, there is a limit from the viewpoint of ensuring sufficient high-speed response by reducing the weight of the rotor to reduce the moment of inertia. Due to the increase in size and weight, it is disadvantageous in terms of cost reduction and energy saving, and there is room for further improvement from the viewpoint of solving these problems.

A second problem is that, since a structure in which structural elements such as leno disks and magnets are arranged on the outer peripheral surface or the side surface of the rolling bearing is employed, the overall structure becomes complicated and since large rolling bearings are used, the thickness of the entire device increases. As a result, it is not possible to meet the installation requirements in a narrow space with the interval of about 10 [mm], and there is room for further improvement from the viewpoint of increasing versatility.

An object of the present invention to provide a rotation drive device that solves the problems existing in the background art.

In order to solve the above-described problems, the present invention provides a rotation drive device M including: a fixed body portion Mc having a stator 2 in which a plurality of stator core portions 2c are integrally provided and a stator coil 3 wound around the stator core portion 2c; and a movable body portion Mm having a rotor magnet 4 having a plurality of magnetic poles facing the fixed body portion Mc and a rotor yoke 5 attached to the rotor magnet 4, the rotation drive device M including: the movable body portion Mm having the rotor yoke 5 formed in a ring shape and a ring-shaped rotor magnet 4 in which a plurality of magnetic poles are arranged along a circumferential direction Ff of an outer peripheral portion 5e of the rotor yoke 5; the fixed body portion Mc in which a plurality of stator core portions 2c, each of which faces an outer peripheral portion Mme of the movable body portion Mm, are arranged in an inner peripheral portion 2i of the stator 2 formed in a ring shape at predetermined intervals along the circumferential direction Ff; and a movable body support portion Ms formed of a plurality of support rollers 6 rotatably supporting the movable body portion Mm by being fixed in position with respect to the stator 2 and bringing a roller peripheral surface 6f into contact with the outer peripheral portion Mme or an inner peripheral portion Mmi of the movable body portion Mm.

In this case, according to a preferred embodiment of the present invention, it is desirable to use a radial bearing 6b for the support roller 6. At this time, when forming the radial bearing 6b, the radial bearing 6b may be entirely or partially made of a non-magnetic material, including at least an outer ring portion 6be, or the radial bearing 6b may be entirely made of a magnetic material. When forming from a magnetic material, a separate roller cover ring 6br made of a non-magnetic material may be integrally provided on the outer peripheral surface of the radial bearing 6b. On the other hand, as the rotor magnet 4, it is desirable to use an integrally molded magnet magnetized into a plurality of poles in the circumferential direction Ff. In addition, it is desirable that the rotor yoke 5 be formed thinner than the rotor magnet 4. In addition, it is desirable that the fixed body portion Mc has a ring-shaped base portion 11 which supports one end surface 2s of the stator 2 and on which the movable body support portion Ms is arranged. By doing so, the fixed body portion Mc can be formed such that the support roller 6 arranged on the base portion 11 is accommodated in an accommodation space 12 formed by removing some of the plurality of stator core portions 2c so that the roller peripheral surface 6f of the support roller 6 is brought into contact with the outer peripheral portion Mme or the inner peripheral portion Mmi of the movable body portion Mm. On the other hand, a roller peripheral surface 6f of the support roller 6 arranged on the base portion 11 is brought into contact with the outer peripheral portion Mme or the inner peripheral portion Mmi of the movable body portion Mm at a position offset in an axial direction Fs with respect to the stator 2. When the roller peripheral surface 6f of the support roller 6 is offset in the axial direction Fs with respect to the stator 2, it is desirable that the movable body portion Mm is integrally provided with a ring-shaped auxiliary body portion Mms extending in the axial direction Fs so that the roller peripheral surface 6f of the support roller 6 comes into contact with the outer peripheral portion Mme or the inner peripheral portion Mmi. On the other hand, the movable body portion Mm may include a roller guide 13 having stopper portions 14p and 14q for restricting relative displacement in the axial direction Fs of the support roller 6, and the roller guide 13 may be entirely or at least partially made of a lubricating synthetic resin material. Further, the roller guide 13 may have a covering sheet portion 15d or 15u covering an inner peripheral surface 5i of the rotor yoke 5 and/or an outer peripheral surface 4e of the rotor magnet 4, and the covering sheet portion 15u of the roller guide 13, covering the outer peripheral surface 4e of the rotor magnet 4 may be made of a non-magnetic metal material. In addition, some of the plurality of stator core portions 2c may be formed as sensor support portions 2ca and 2cb for supporting sensors 16a and 16b, respectively. The movable body portion Mm may be formed as a hollow portion Sa inside from the inner peripheral portion Mmi, and the movable body portion Mm may be formed as a specific functional portion Sb or Sc that causes a specific function by rotation inside the inner peripheral portion Mmi.

According to the rotation drive device M according to the present invention having such a configuration, the following remarkable effects are obtained.

The movable body portion Mm has the ring-shaped rotor yoke 5 and the ring-shaped rotor magnet 4 in which a plurality of magnetic poles are arranged along the circumferential direction Ff of the outer peripheral portion 5e of the rotor yoke 5. Thus, the conventional large rolling bearings that rotate the movable body portion Mm can be eliminated. As a result, it is possible to significantly reduce the weight of the movable body portion Mm, reduce the moment of inertia while supporting high torque, and ensure sufficient high-speed responsiveness in the rotation drive device M and improve cost efficiency and energy saving.

The rotation drive device includes the fixed body portion Mc in which a plurality of stator core portions 2c facing the outer peripheral portion Mme of the movable body portion Mm are arranged at predetermined intervals along the circumferential direction Ff on the inner peripheral portion 2i of the stator 2 formed in a ring shape and the movable body support portion Ms formed of a plurality of support rollers 6 rotatably supporting the movable body portion Mm by being fixed in position with respect to the stator 2 and bringing a roller peripheral surface 6f into contact with the outer peripheral portion Mme or an inner peripheral portion Mmi of the movable body portion Mm. Thus, the overall structure can be simplified, and in particular, the overall thickness of the device can be reduced. As a result, it is possible to provide a rotation drive device M that is excellent in versatility and expandability, such as being able to sufficiently respond to installation requirements in narrow spaces where the interval is about 10 [mm] or less.

According to a preferred embodiment, when the radial bearing 6b is used as the support roller 6, general-purpose parts, such as ball bearings, which are small, lightweight, and have various variations, can be used. Thus, it is possible to obtain the intended rotation drive device M with higher performance easily and at low cost.

According to a preferred embodiment, when the radial bearing 6b is entirely or partially made of a non-magnetic material, including at least the outer ring portion 6be, the magnetic attraction force between the rotor magnet 4 and the radial bearing 6b can be eliminated or reduced. Thus, the pressure in the sliding portion of the radial bearing 6b can be reduced, and the durability of the radial bearing 6b can be enhanced.

According to a preferred embodiment, when the radial bearing 6b is entirely made of a magnetic material, the magnetic attraction force between the rotor magnet 4 and the radial bearing 6b can be increased. Thus, the movable body portion Mm can be stably rotated (moved) at the neutral point position between the rotor magnet 4 and the radial bearing 6b.

According to a preferred embodiment, when the radial bearing 6b is integrally provided with a separate roller cover ring 6br made of a non-magnetic material on the outer peripheral surface of the radial bearing 6b, it is possible to reduce the magnetic attraction force between the rotor magnet 4 and the radial bearing 6b and improve the durability. Further, it is possible to particularly reduce cogging and suppress vibrations during rotation of the movable body portion Mm.

According to a preferred embodiment, when an integrally molded magnet divided and magnetized into a plurality of poles in the circumferential direction Ff is used as the rotor magnet 4, there is no need to assemble a plurality of individual magnets, which facilitates assembly and achieves homogenization, increased strength, and reduced cost. Further, in particular, since the rotor magnet 4 can be made thinner, which contributes to a further reduction in moment of inertia due to weight reduction of the movable body portion Mm.

According to a preferred embodiment, when the rotor yoke 5 is formed thinner than the rotor magnet 4, lightweight can be achieved while avoiding saturation of the magnetic circuit by split magnetization of the multiple poles in addition to the thinning of the rotor magnet 4. Thus, in particular, the weight of the rotor yoke 5 and the rotor magnet 4, which have a large specific gravity, can be minimized, and the movable body portion Mm can be formed as an optimum form.

According to a preferred embodiment, when the ring-shaped base portion 11 which supports one end surface 2s of the stator 2 and on which the movable body support portion Ms is arranged is provided on the fixed body portion Mc, this base portion 11 can function as a part of a mechanical components of the fixed body portion Mc. Thus, the base portion 11 can be used as a housing functional portion for arranging a circuit board and the like as well as the support roller 6 and an attachment functional portion when attaching the rotation drive device M.

According to a preferred embodiment, when the fixed body portion Mc is formed by accommodating the support roller 6 arranged in the base portion 11 in the accommodation space 12 formed by removing some of the plurality of stator core portions 2c so that the roller peripheral surface 6f of the support roller 6 is brought into contact with the outer peripheral portion Mme or the inner peripheral portion Mmi of the movable body portion Mm, the support rollers 6 can be disposed at the same position as the stator core portion 2c in the axial direction Fs. Thus, it is possible to avoid unnecessary projection in the radial direction and the axial direction Fs by each support roller 6, and reduce the thicknesses of the movable body portion Mm and furthermore the rotation drive device M in a reasonable manner.

According to a preferred embodiment, when the fixed body portion Mc is formed by bringing the roller peripheral surface 6f of the support roller 6 arranged on the base portion 11 into contact with the outer peripheral portion Mme or the inner peripheral portion Mmi of the movable body portion Mm at a position offset in the axial direction Fs with respect to the stator 2, the support roller 6 can be brought into contact with the inner peripheral portion Mmi of the movable body portion Mm, or the support rollers 6 can be arranged side by side in the axial direction Fs with respect to the stator 2. In particular, when reduction in the thickness of the rotation drive device M is not required, it is possible to various rotation drive devices M constructed by adding various functions using the hollow portion.

According to a preferred embodiment, when the movable body portion Mm is integrally provided with the ring-shaped auxiliary body portion Mms extending in the axial direction Fs so that the roller peripheral surface 6f of the support roller 6 comes into contact with the outer peripheral portion Mme or the inner peripheral portion Mmi, the support rollers 6 can be arranged side by side in the axial direction Fs with respect to the stator 2. Thus, by increasing the number of stator core portions 2c and stator coils 3, it is possible to improve the performance of the fixed body portion Mc and enhance the stability and smoothness of support for the movable body portion Mm.

According to a preferred aspect, when the movable body portion Mm is provided with a roller guide 13 having stopper portions 14p and 14q for restricting the relative displacement in the axial direction Fs of the support roller 6, the relative displacement of the movable body portion Mm in the axial direction Fs with respect to the fixed body portion Mc is restricted by the magnetic force. However, when mechanical displacement occurs due to the action of disturbance or the like, the displacement is restricted by the stopper portions 14p and 14q. Thus, it is possible to prevent the so-called detachment (dropping) of the movable body portion Mm from the fixed body portion Mc and further enhance the stability and reliability.

According to a preferred embodiment, when the roller guide 13 is entirely or at least partially made of a lubricating synthetic resin material, the physical properties of the lubricating synthetic resin material can be utilized. Thus, it is possible to realize smooth rotation (operation) of the movable body portion Mm and effectively absorb vibration and noise during rotation (operation).

According to a preferred embodiment, when the roller guide 13 is provided with a covering sheet portion 15d or 15u covering the inner peripheral surface 5i of the rotor yoke 5 and/or the outer peripheral surface 4e of the rotor magnet 4, the support roller 6 comes into contact with the covering sheet portion 15d or 15u when coming into contact with the movable body portion Mm. Thus, the effect of absorbing vibration and noise and the effect of smoothing rotation (operation) can be obtained more effectively, and control responsiveness can be further improved.

According to a preferred embodiment, when the covering sheet portion 15u of the roller guide 13, covering the outer peripheral surface 4e of the rotor magnet 4 is made of a non-magnetic metal material, it is possible to support the rotor magnet 4 formed by combining a plurality of single-pole magnets and further enhance the flatness accuracy of the outer peripheral portion Mme of the movable body portion Mm. Thus, it is possible to further stabilize the contact with the support roller 6 and reduce the gap between the stator core portions 2c to increase the magnetic flux density.

According to a preferred embodiment, when some of the plurality of stator core portions 2c are formed as sensor support portions 2ca and 2cb for supporting the sensors 16a and 16b, it is not necessary to secure the arrangement location of the sensors 16a and 16b outside the stator 2. Thus, even when various sensors 16a and 16b are provided, it is possible to avoid problems that cause an increase in size and complexity.

According to a preferred embodiment, when the movable body portion Mm is formed as a hollow portion Sa inside from the inner peripheral portion Mmi, the rotation drive device is optimally used for an automatic weaving machine that supplies threads or the like using the hollow portion (space) Sa.

According to a preferred embodiment, when the movable body portion Mm is formed as a specific functional portion Sb or Sc that causes a specific function by rotation inside the inner peripheral portion Mmi, it is possible to provide a rotation drive device M that is excellent in versatility and expandability, such as being able to be used and applied to various applications such as RGB color filters of optical devices (single-plate projectors and the like) that project color-separated light and blowers for special purposes.

M: Rotation drive device, Mm: Movable body portion, Mme: Outer peripheral portion of movable body portion, Mmi: Inner peripheral portion of movable body portion, Mms: Auxiliary body portion, Mc: Fixed body portion, Mce: Outer peripheral portion of fixed body portion, Ms: Movable body support portion, 2: tator, 2$c$: Stator core portion, 2$ca$: Sensor support portion, 2$cb$: Sensor support portion, 2$i$: Inner peripheral portion of stator, 2$s$: One end surface of stator, 3: Stator coil, 4: Rotor magnet, 4$e$: Outer peripheral surface of rotor magnet, 5: Rotor yoke, 5$e$: Outer peripheral portion of rotor yoke, 5$i$: Inner peripheral surface of rotor yoke, 6: Support roller, 6$f$: Roller peripheral surface, 6$b$: Radial bearing, 6$be$: Outer ring portion of radial bearing, 6$br$: Roller cover ring, 11: Base portion, 12: Accommodation space, 13: Roller guide, 14$p$: Stopper portion, 14$q$: Stopper portion, 15$d$: Covering sheet portion, 15$u$: Covering sheet portion, 16$a$: Sensor, 16$b$: Sensor, Ff: Circumferential direction, Fs: Axial direction, Zp: Side region on one side, Zq: Side region on the other side, Sa: Hollow portion, Sb: Specific functional portion (filter functional portion), Sc: Specific functional portion (blowing functional portion)

DETAILED DESCRIPTION OF THE INVENTION

Next, preferred embodiments (first, second and third embodiments) according to the present invention will be described in detail with reference to the drawings.

First Embodiment

First, the configuration of a rotation drive device M according to a first embodiment of the present embodiment will be described with reference to FIGS. 1 to 6.

Figure 1:
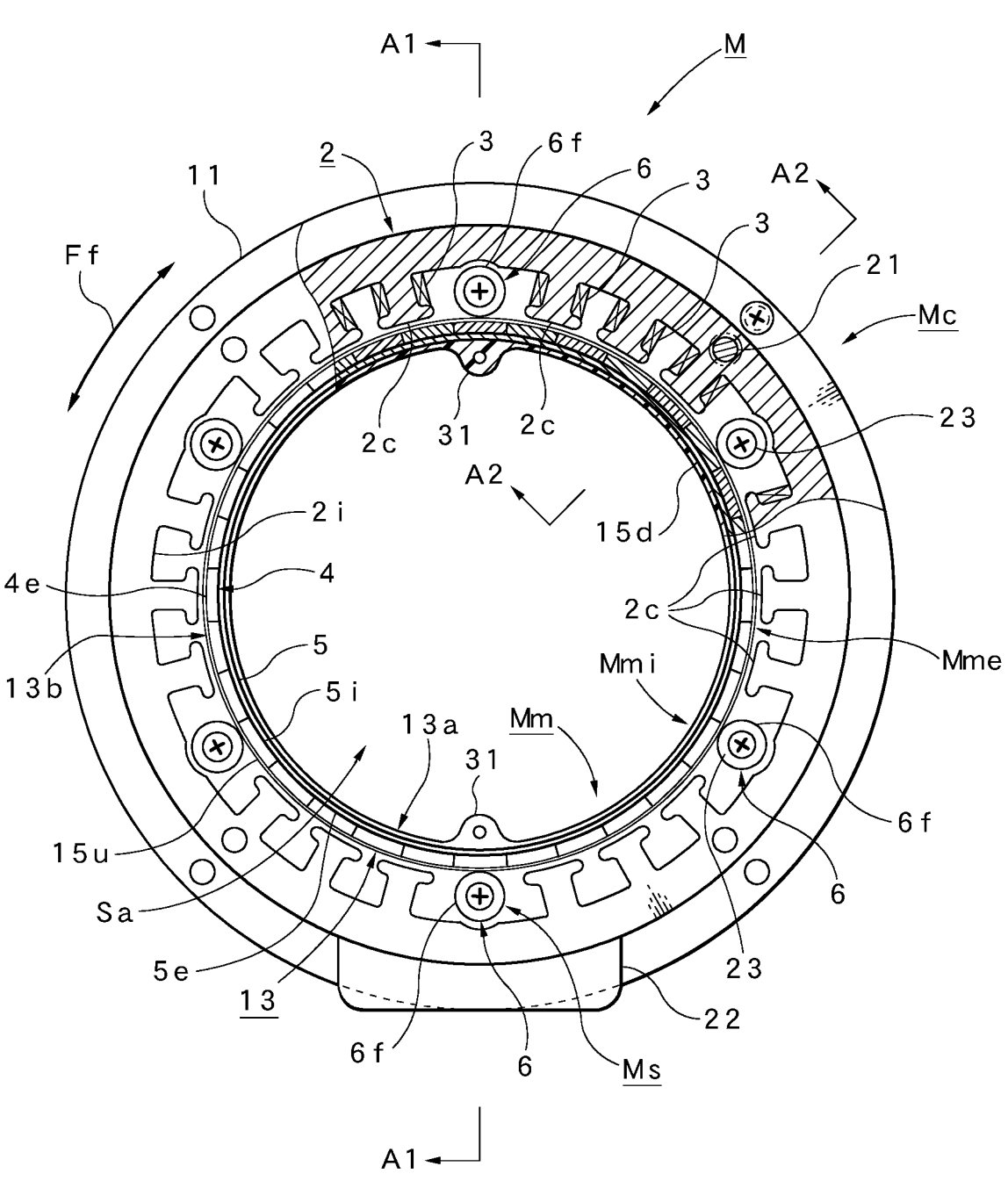
FIG. 1 is a front view including a partial cross-sectional portion of a rotation drive device of a first embodiment according to a preferred embodiment of the present invention, excluding a dust-proof cover.

FIG. 1 shows the overall configuration of a mechanical portion of the rotation drive device M. The rotation drive device M is roughly composed of a fixed body portion Mc, a movable body portion Mm, and a movable body support portion Ms.

The fixed body portion Mc includes a stator 2 shown in FIG. 1 integrally formed in a ring shape as a whole. In this case, eddy current loss can be effectively reduced when the stator 2 is formed using a laminate obtained by laminating a plurality of non-oriented electromagnetic steel sheets such as silicon steel sheets. The stator 2 integrally has a plurality of T-shaped stator core portions 2$c$ arranged at predetermined intervals in a circumferential direction Ff on an inner peripheral portion 2$i$ so as to projecting toward the center. It is desirable that the width dimension of the stator core portion 2$c$ in the axial direction Fs is selected to be approximately 0.8 times or less than the width dimension of the rotor magnet 4 in the axial direction Fs, which will be described later. With this selection, the magnetic attraction force between the rotor magnet 4 and the stator core portion

2$c$ can be made uniform, so that the movable body portion Mm, which will be described later, can be stably held at the magnetic center position.

Each stator core portion 2$c$ faces the outer peripheral portion Mme of the movable body portion Mm with a slight gap therebetween. In the case of illustration, the pitch (interval) between the stator core portions 2$c$ is selected so that the number of poles of the stator core portions 2$c$ becomes 24 when the interval is set constant, and three consecutive stator core portions 2$c$ are left and the next stator core portion 2$c$ is removed, thereby sequentially forming an arrangement pattern formed as an accommodation space 12. In this way, the entire stator core portion 2$c$ can be set to have 18 poles, and six accommodation spaces 12 arranged at regular intervals in the circumferential direction Ff can be provided.

Insulation is ensured by applying a coating such as an epoxy resin or a polyimide resin to the winding portion of each stator core portion 2$c$. A stator coil 3 wound with a coil wire (magnet wire) using an insulated coating wire is attached to the stator core portion 2$c$. In FIG. 1, the stator coil 3 is shown only in the portion shown in cross-section, and the stator coil 3 is omitted in the other portions.

Figure 2:
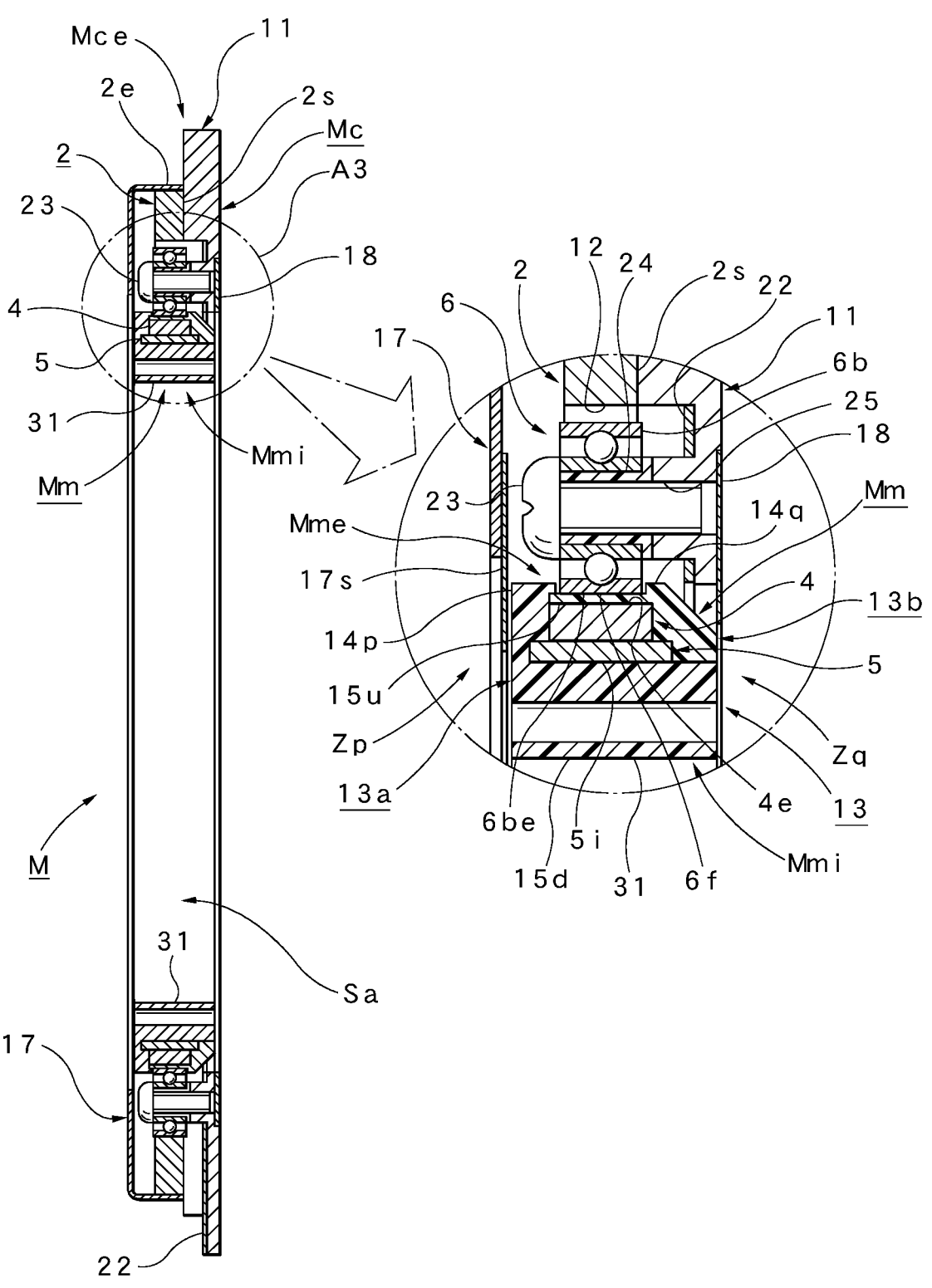
FIG. 2 is a cross-sectional view of the rotation drive device taken along line A1-A1 in FIG. 1 (including an extracted enlarged view within the dashed-dotted line A3).

Further, the fixed body portion Mc is provided with a ring-shaped base portion 11 having a larger outer diameter than the stator 2. The base portion 11 is desirably integrally formed of an aluminum material having high thermal conductivity (heat dissipation) and non-magnetism. As shown in FIGS. 1 and 2, the base portion 11 is superimposed on one end surface 2$s$ (back surface) of the stator 2 and fixed with a fixing screw 21 to support the stator 2, and a movable body support portion Ms, which will be described later, is arranged on the front surface side of the base portion 11. In the drawings, reference numeral 22 denotes a circuit board attached to the inner surface of the base portion 11.

In this manner, when the ring-shaped base portion 11 which supports one end surface 2$s$ of the stator 2 and on which the movable body support portion Ms is arranged is provided on the fixed body portion Mc, this base portion 11 can function as a part of a mechanical components of the fixed body portion Mc. Thus, the base portion 11 can be used as a housing functional portion for arranging a circuit board and the like as well as the support roller 6 and an attachment functional portion when attaching the rotation drive device M.

Figure 3:
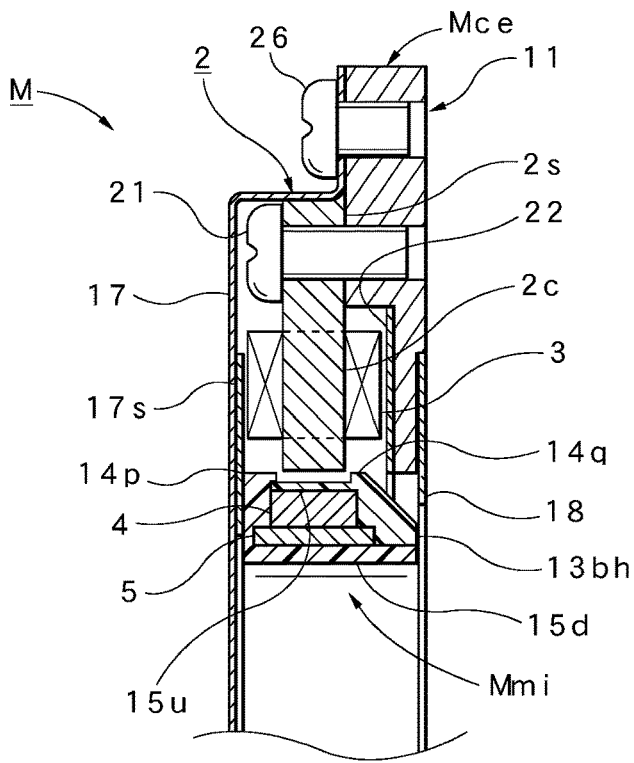
FIG. 3 is a cross-sectional view of the rotation drive device taken along line A2-A2 in FIG. 1.

On the other hand, the movable body support portion Ms is composed of six support rollers 6 fixed in position with respect to the stator 2. In this case, as shown in FIGS. 2 and 3, a roller support shaft portion 6$s$ for rotatably supporting the center of each support roller 6 is attached to the base portion 11, the arrangement position is selected so that the support rollers 6 can be accommodated in the six accommodation spaces 12, and the outer diameter or the like of the support roller 6 is selected so that the roller peripheral surface 6$f$ of the support roller 6 comes into contact with the outer peripheral portion Mme of the movable body portion Mm. The movable body portion Mm and the movable body support portion Ms are extracted and shown in FIG. 6. In addition, the six support rollers 6 have the function of rotatably supporting the movable body portion Mm by bringing the roller peripheral surface 6$f$ into contact with the outer peripheral portion Mme of the movable body portion Mm, which will be described later. Thus, the movable body support portion Ms can be generally formed with a plurality of (three or more) support rollers 6 by taking the number and the like of stator core portions 2$c$ into consideration.

A radial bearing 6b such as a ball bearing or a roller bearing is used for each support roller 6. When the radial bearing 6b is used as the support roller 6, general-purpose parts, such as ball bearings, which are small, lightweight, and have various variations, can be used. Thus, it is possible to obtain the intended rotation drive device M with higher performance easily and at low cost.

The illustrated radial bearing 6b illustrates a case where the radial bearing 6b is entirely made of a magnetic material as a constituent material. In this way, when the radial bearing 6b is entirely made of a magnetic material, the magnetic attraction force between the rotor magnet 4 and the radial bearing 6b can be increased. Thus, the movable body portion Mm can be stably rotated (moved) at the neutral point position between the rotor magnet 4 and the radial bearing 6b.

Figure 9:
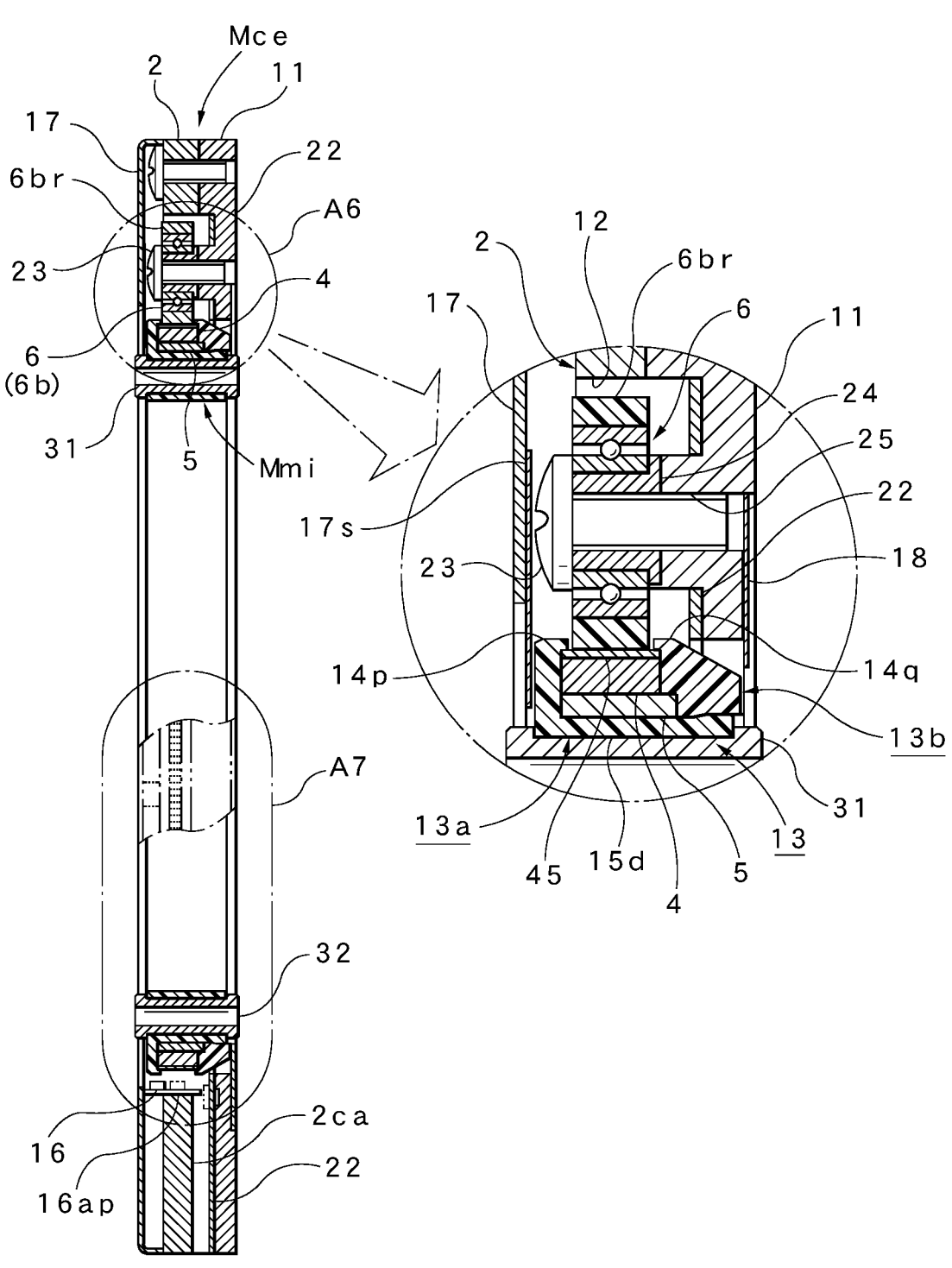
FIG. 9 is a cross-sectional view of the rotation drive device taken along line A4-A4 in FIG. 8 (including an extracted enlarged view within the dashed-dotted line A6).
Figure 10:
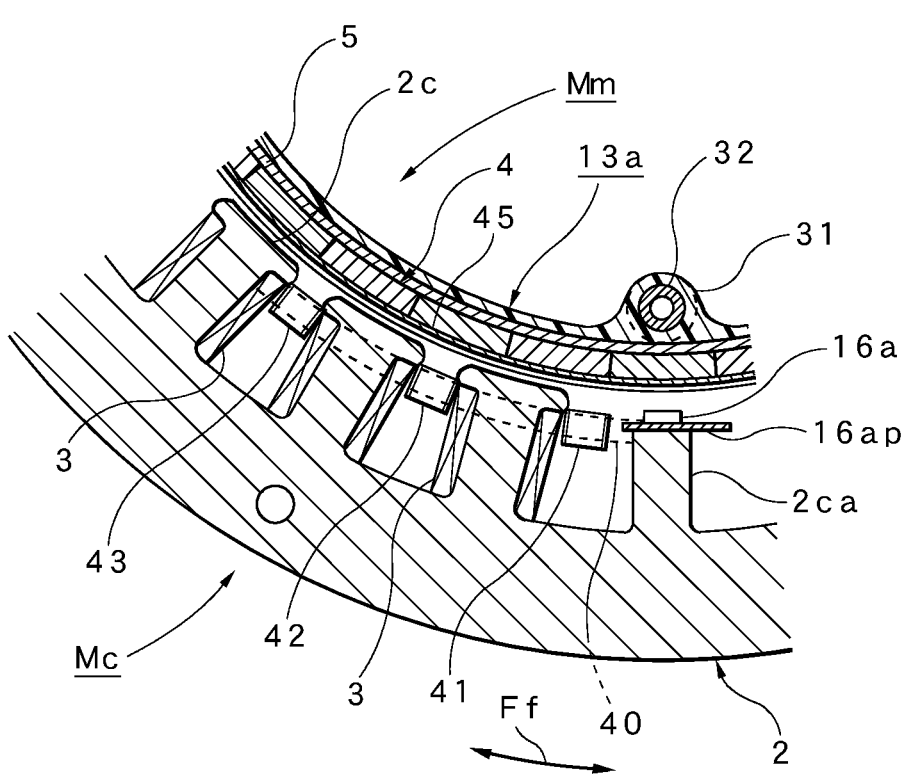
FIG. 10 is an extracted cross-sectional view of the rotation drive device within the dashed-dotted line A5 in FIG. 8.

On the other hand, for the radial bearing 6b, various types can be selected depending on the constituent material. As an example, the radial bearing 6b may be entirely or partially made of a non-magnetic material, including at least an outer ring portion 6be (see FIG. 2). In this way, when the radial bearing 6b is entirely or partially made of a non-magnetic material, including at least the outer ring portion 6be, the magnetic attraction force between the rotor magnet 4 and the radial bearing 6b can be eliminated or reduced. Thus, the pressure in the sliding portion of the radial bearing 6b can be reduced, and the durability of the radial bearing 6b can be enhanced. On the other hand, as in a second embodiment to be described later, the radial bearing 6b can be integrally provided with a separate roller cover ring 6br made of a non-magnetic material on the outer peripheral surface of the radial bearing 6b (see FIG. 9). When such a roller cover ring 6br is provided, it is possible to reduce the magnetic attraction force between the rotor magnet 4 and the radial bearing 6b and improve the durability. Further, it is possible to particularly reduce cogging and suppress vibrations during rotation of the movable body portion Mm.

When the support roller 6 (the radial bearing 6b) is attached to the base portion 11, as shown in FIG. 2, an attachment screw 23 and a collar 24 constitute a roller support shaft portion 6s, the collar 24 is inserted into the inner hole of the support roller 6, and the attachment screw 23 inserted into this collar 24. In this way, the support roller 6 can be screwed into a threaded hole 25 formed in the base portion 11.

Thus, when the fixed body portion Mc is formed by accommodating the support roller 6 arranged in the base portion 11 in the accommodation space 12 formed by removing some of the plurality of stator core portions 2c so that the roller peripheral surface 6f of the support roller 6 is brought into contact with the outer peripheral portion Mme or the inner peripheral portion Mmi of the movable body portion Mm, the support rollers 6 can be disposed at the same position as the stator core portion 2c in the axial direction Fs. Thus, it is possible to avoid unnecessary projection in the radial direction and the axial direction Fs by each support roller 6, and reduce the thicknesses of the movable body portion Mm and furthermore the rotation drive device M in a reasonable manner.

On the other hand, the movable body portion Mm includes a ring-shaped rotor yoke 5 and a ring-shaped rotor magnet 4 in which a plurality of magnetic poles are arranged along the circumferential direction Ff of an outer peripheral portion 5e of the rotor yoke 5.

In this case, an integrally molded magnet divided and magnetized into thirty-two poles in the circumferential direction Ff is used as the rotor magnet 4. When such a rotor magnet 4 is used, there is no need to assemble a plurality of individual magnets, which facilitates assembly and achieves homogenization, increased strength, and reduced cost. Further, in particular, since the rotor magnet 4 can be made thinner, which contributes to a further reduction in moment of inertia due to weight reduction of the movable body portion Mm.

The rotor yoke 5 is integrally formed into a ring shape as a whole from a soft magnetic material such as iron. In this case, the rotor yoke 5 is formed thinner than the rotor magnet 4. By forming in this way, lightweight can be achieved while avoiding saturation of the magnetic circuit by split magnetization of the multiple poles in addition to the thinning of the rotor magnet 4. Thus, in particular, the weight of the rotor yoke 5 and the rotor magnet 4, which have a large specific gravity, can be minimized, and the movable body portion Mm can be formed as an optimum form. The rotor magnet 4 can be assembled so that the inner peripheral portion 4i of the rotor magnet 4 comes into contact with the outer peripheral portion 5e of the rotor yoke 5.

Furthermore, the movable body portion Mm includes a roller guide 13. The illustrated roller guide 13 is formed by a combination of a first ring member 13a and a second ring member 13b. Each of the ring members 13a and 13b is integrally molded into a ring shape using a lubricating synthetic resin having a small moment of inertia and wear load and excellent wear resistance. As the lubricating synthetic resin, a fluorine resin, a cast nylon resin, an ultra-high molecular weight polyethylene resin, a polyacetal resin, and the like can be used.

Thus, when the roller guide 13 (the first ring member 13a and the second ring member 13b) is entirely made of a lubricating synthetic resin material, the physical properties of the lubricating synthetic resin material can be utilized. Thus, it is possible to realize smooth rotation (operation) of the movable body portion Mm and effectively absorb vibration and noise during rotation (operation). In the illustrated case, the entire roller guide 13 is entirely integrally formed of a lubricating synthetic resin material. However, as in the second embodiment to be described later, the roller guide 13 may be partially formed of a lubricating synthetic resin material, and the other remaining portion may be formed of other materials (non-magnetic metal materials and the like).

As shown in FIG. 2, the first ring member 13a includes a ring-shaped covering sheet portion 15d that covers the inner peripheral surface 5i of the rotor yoke 5 and a ring-shaped stopper portion 14p that is integrally formed at an edge on one side in the axial direction Fs of the covering sheet portion 15d to restrict the relative displacement in the axial direction Fs of the support roller 6. The entire covering sheet portion 15d is formed to have a constant thickness, the stopper portion 14p extends outward in the radial direction of the covering sheet portion 15d, and a recessed portion into which an edge portion of the rotor yoke 5 and an edge portion of the rotor magnet 4 can be fitted is formed in the inner surface of the stopper portion 14p (see FIG. 4). Reference numerals 31 and 31 denote yarn guides provided at positions separated by 180° on the inner peripheral surface of the roller guide 13.

The second ring member 13b includes a ring-shaped covering sheet portion 15u that covers the outer peripheral surface 4e of the rotor magnet 4 and a ring-shaped stopper portion 14q that is integrally formed at an edge on the other side in the axial direction Fs of the covering sheet portion 15u to restrict the relative displacement in the axial direction Fs of the support roller 6. The entire covering sheet portion 15u is formed to have a constant thickness, and the stopper portion 14q is formed to extend outward in the radial direction of the covering sheet portion 15u. Further, a holding portion 13bh is integrally formed radially inwardly of the stopper portion 14q, and a recessed portion into which an edge portion of the rotor yoke 5 and an edge portion of the rotor magnet 4 can be fitted is formed in the inner surface of the holding portion 13bh (see FIG. 4).

As a result, when the movable body portion Mm, the fixed body portion Mc, and the movable body support portion Ms are assembled, as shown in FIG. 2, since the tip of one stopper portion 14p is positioned at the intermediate portion in the radial direction of an end surface on one side of the outer ring portion 6be of the support roller 6 (the radial bearing 6b), and the tip of the other stopper portion 14q is positioned at the intermediate portion in the radial direction of an end surface on the other side of the outer ring portion 6be, the relative displacement of the support roller 6 in the axial direction Fs can be restricted.

In this manner, when the movable body portion Mm is provided with the roller guide 13 having the stopper portions 14p and 14q for restricting the relative displacement in the axial direction Fs of the support roller 6, the relative displacement of the movable body portion Mm in the axial direction Fs with respect to the fixed body portion Mc is restricted by the magnetic force. However, when mechanical displacement occurs due to the action of disturbance or the like, the displacement is restricted by the stopper portions 14p and 14q. Thus, it is possible to prevent the so-called detachment (dropping) of the movable body portion Mm from the fixed body portion Mc and further enhance the stability and reliability.

Further, when the roller guide 13 is provided with the covering sheet portions 15d and 15u covering the inner peripheral surface 5i of the rotor yoke 5 and/or the outer peripheral surface 4e of the rotor magnet 4, the support roller 6 comes into contact with the covering sheet portion 15d or 15u when coming into contact with the movable body portion Mm. Thus, the effect of absorbing vibration and noise and the effect of smoothing rotation (operation) can be obtained more effectively, and control responsiveness can be further improved.

On the other hand, as shown in FIG. 2, a dust-proof cover 17 to which a ring-shaped dust-proof sheet 17s made of a resin sheet, for example, is attached so as to cover the whole (or part) of the side region Zp is attached to one side region Zp extending from the inner peripheral portion Mmi of the movable body portion Mm located on the front side (the side opposite to the base portion 11) to the outer peripheral portion Mce of the fixed body portion Mc. In this case, the dust-proof sheet 17s shields the space by the resin sheet lightly contacting (sliding) on the roller guide 13 or the like. The dust-proof sheet 17s can be made using a nylon resin, a polyethylene terephthalate resin, a fluorine resin, a polyurethane resin, or the like. In addition, it is desirable to improve wear resistance by selecting a material different from that of the roller guide 13 and the like. When incorporating an optical sensor, it is desirable to consider the light shielding property. Furthermore, the dust-proof cover 17 is desirably made of an aluminum material having high thermal conductivity (heat dissipation) and non-magnetism.

When such a dust-proof cover 17 is attached, even in applications where dust is likely to be generated, such as automatic weaving machines, dust generated from lint and the like can be prevented from entering into the rotation drive device M from the dust-proof cover 17 side. Thus, the reliability and durability of the rotation drive device M can be improved.

Figure 5:
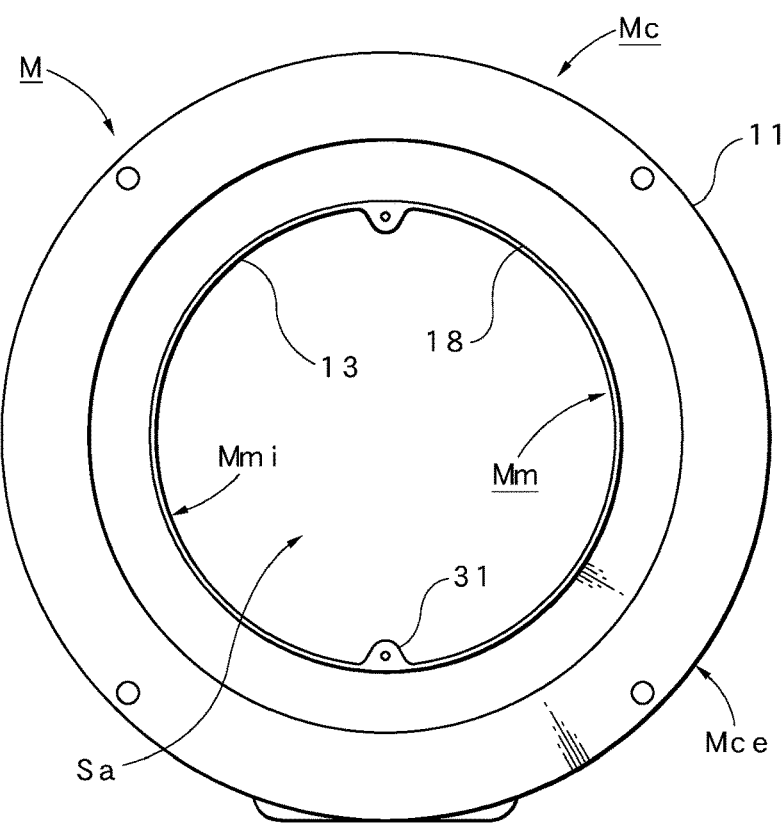
FIG. 5 is an external rear view of the rotation drive device.
Figure 6:
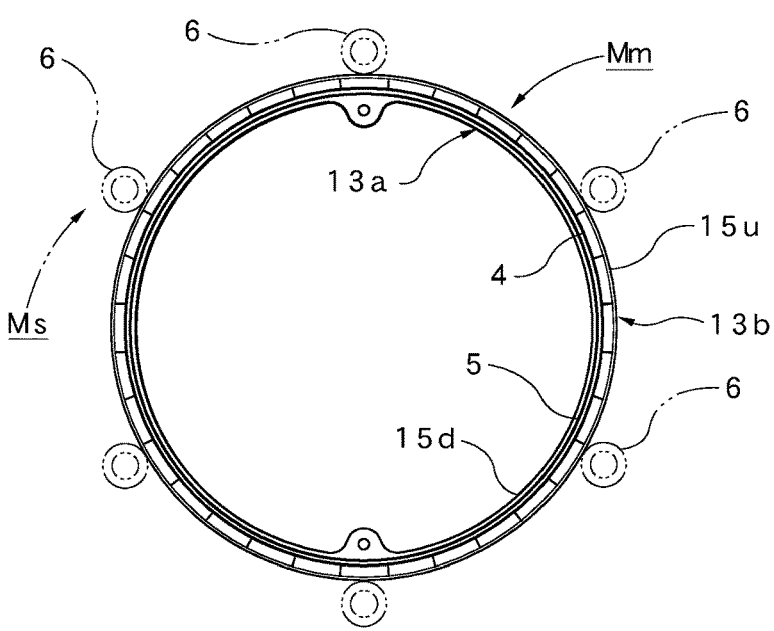
FIG. 6 is a front view of a movable body portion in the rotation drive device.

On the other hand, a ring-shaped dust-proof sheet 18 that is made of a resin sheet, for example, and covers the whole (or part) of the side region Zq is attached to the other side region Zq extending from the outer side of the base portion 11, that is, the inner peripheral portion Mmi of the movable body portion Mm to the outer peripheral portion Mce of the fixed body portion Mc. In this case, except for the shape, the dust-proof sheet 18 can be formed in the same manner as the dust-proof sheet 17s described above. FIG. 5 shows a rear view of the rotation drive device 1 with the dust-proof sheet 18 attached.

Thus, when such a dust-proof sheet 18 is provided, it is possible to prevent dust from entering into the rotation drive device M from the base portion 11 side. Thus, the reliability and durability of the rotation drive device M can be improved. In addition, in particular, when the dust-proof sheet 18 is combined with the dust-proof cover 17, a more effective dust-proof effect can be obtained.

Figure 7:
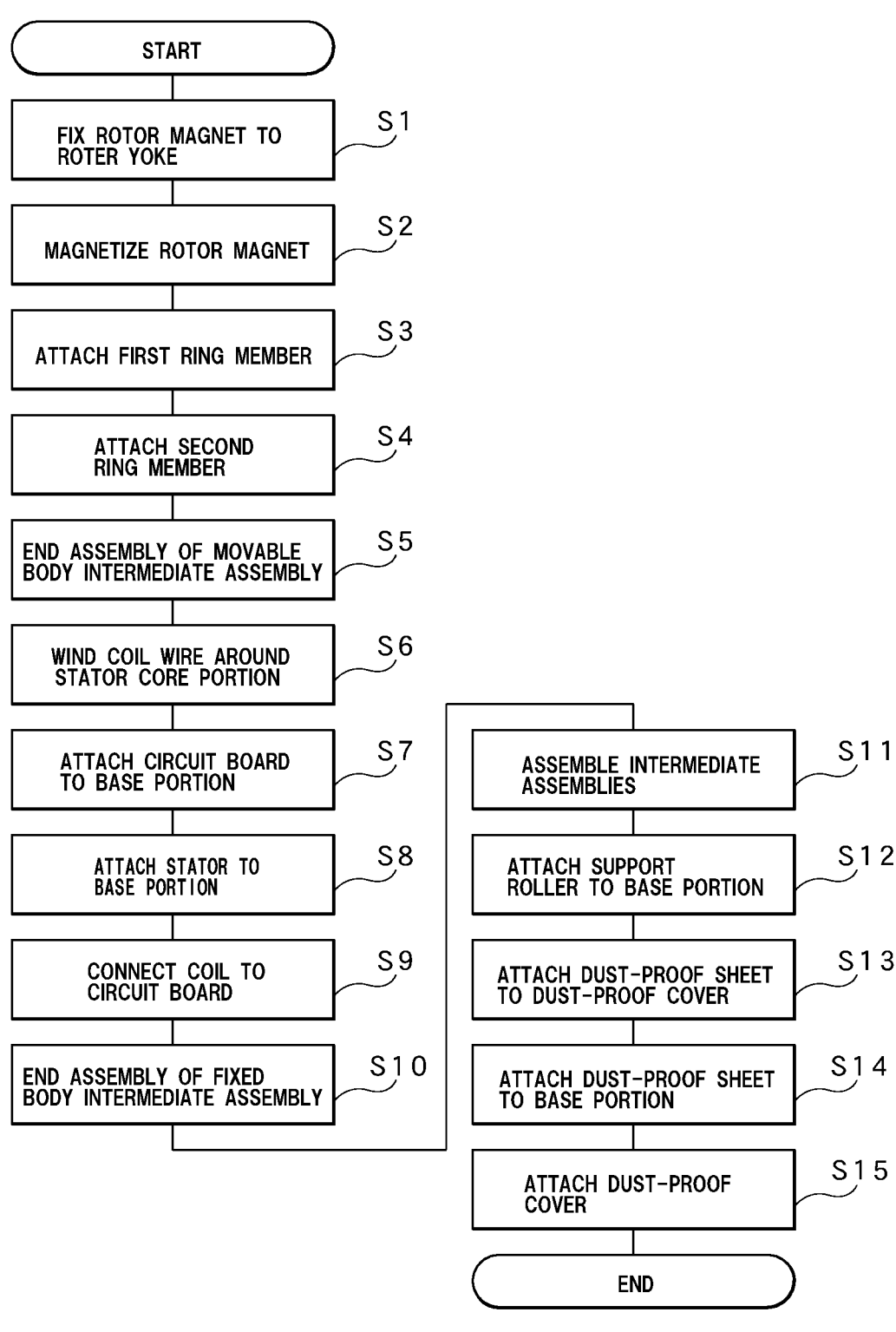
FIG. 7 is a flowchart for explaining a method for manufacturing the rotation drive device.
Figure 8:
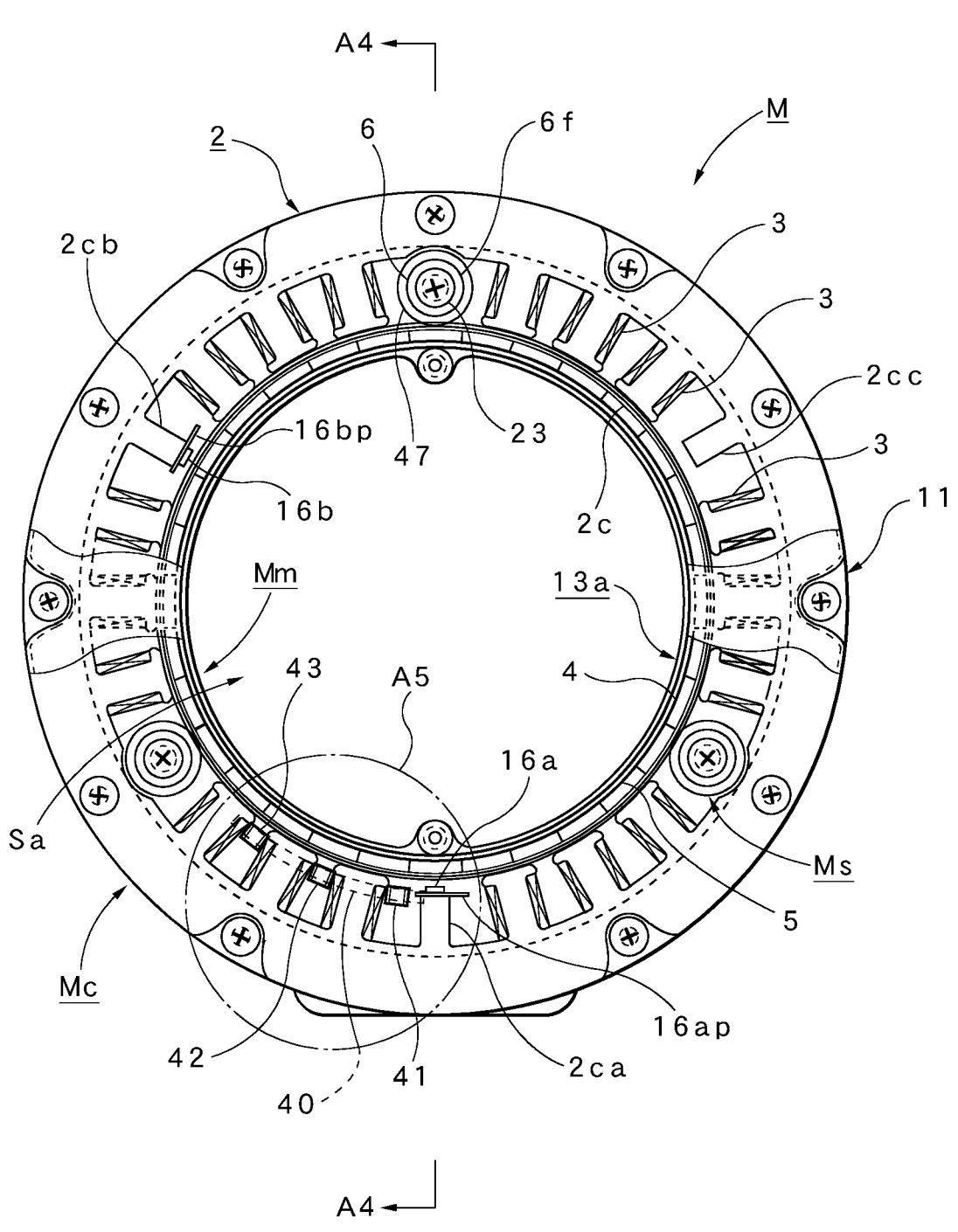
FIG. 8 is a front view including a partially cut-away portion of a rotation drive device of a second embodiment according to the preferred embodiment of the present invention, excluding a dust-proof cover.

Next, an example of the procedure of manufacturing the rotation drive device M according to the first embodiment will be described according to the flowchart shown in FIG. 7 while referring to FIGS. 1 to 6.

First, a non-magnetized rotor magnet 4 is fixed to the rotor yoke 5 (step S1). In this case, the rotor yoke 5 and the rotor magnet 4 are positioned and fixed using an adhesive or the like (step S1). Then, the magnetization process is performed on the non-magnetized rotor magnet 4 fixed to the rotor yoke 5 (step S2).

Figure 4:
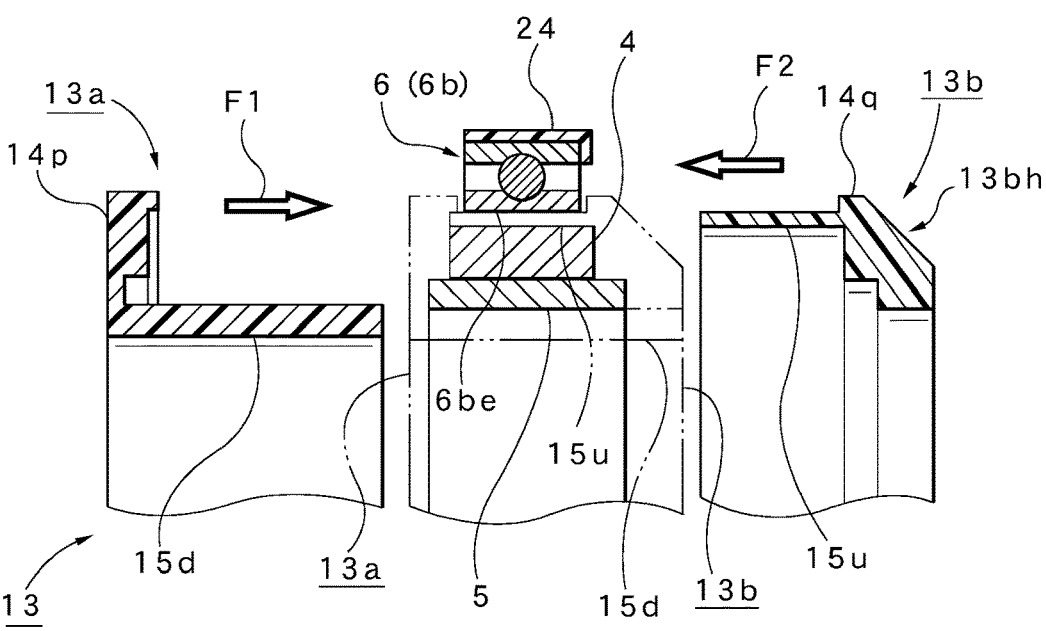
FIG. 4 is a partially exploded cross-sectional view of a roller guide in the rotation drive device.

Next, the first ring member 13a is attached to one end side of the integrated rotor yoke 5 and rotor magnet 4 using an adhesive or the like (step S3). In this case, as shown in FIG. 4, the first ring member 13a is relatively displaced in the direction of arrow F1 with respect to the rotor yoke 5 and the rotor magnet 4, and the covering sheet portion 15d is inserted inside the rotor yoke 5 and assembled at the position indicated by the imaginary line. One end of the rotor yoke 5 and rotor magnet 4 is brought into contact (fitted) with the inner surface of the stopper portion 14p.

Further, the second ring member 13b is attached to the rotor yoke 5 and the other end of the rotor magnet 4 using an adhesive or the like (step S4). In this case, similarly to the first ring member 13a side, the second ring member 13b is relatively displaced in the direction of arrow F2 with respect to the rotor yoke 5 and the rotor magnet 4, and the covering sheet portion 15u is assembled with respect to the outer peripheral surface of the rotor magnet 4 as indicated by the imaginary line. The other end of the rotor yoke 5 and rotor magnet 4 is brought into contact (fitted) with the inner surface of the holding portion 13bh of the second ring member 13b. In this way, the assembly of the movable body intermediate assembly on the side of the movable body portion Mm is completed (step S5).

On the other hand, a coil wire is wound around each stator core portion 2c of the stator 2 (step S6). In this way, the stator coil 3 is attached to each stator core portion 2c. Further, the circuit board 22 is attached to the base portion 11 (step S7). Then, the stator 2 is attached to the base portion 11, and the stator coil 3 of the stator 2 is connected to the circuit board 22 by soldering or the like (steps S8 and S9). In this way, the assembly of the fixed body intermediate assembly on the side of the fixed body portion Mc is completed (step S10).

Next, the movable intermediate assembly is set at a fixed position with respect to the fixed intermediate assembly (step S11). In this state, the six support rollers 6 are accommodated in the respective accommodation spaces 12, and the support rollers 6 are attached to the base portion 11

(step S12). As shown in FIG. 2, the support roller 6 is attached by inserting the collar 24 into the inner hole of the support roller 6 and inserting the attachment screw 23 through the collar 24 to screw it into the screw hole 25 formed in the base portion 11. As a result, the movable body support portion Ms is formed in which each support roller 6 is rotatably supported by the roller support shaft portion 6s formed by the attachment screw 23 and the collar 24. Further, the stopper portions 14p and 14q are arranged on both sides of each support roller 6, that is, the outer ring portion 6be of the radial bearing 6b, and the detachment of the movable body portion Mm in the axial direction Fs is prevented by the radial bearing 6b.

Thereafter, the dust-proof sheet 17s is attached to the dust-proof cover 17, and the dust-proof sheet 18 is attached to the base portion 11 (steps S13 and S14). Further, the dust-proof cover 17 with the dust-proof sheet 17s is attached to the base portion 11 using the fixing screws 26 (step S15). In this way, the intended rotation drive device M can be obtained.

The rotation drive device M formed as described above can be rotated as a three-phase DC brushless motor by connecting each stator coil 3 and sensors (not shown) to a drive controller (not shown) through the circuit board 22. In this case, the stator coil 3 in each phase can be connected by a known connection method such as star connection or delta connection, and in particular, torque ripple can be reduced by adopting a bipolar drive system. In addition, although the three-phase system has been exemplified, various multi-phase systems such as two-phase, four-phase, and five-phase systems can be used. Further, when the movable body portion Mm is formed as the hollow portion Sa inside from the inner peripheral portion Mmi, the rotation drive device is optimally used for an automatic weaving machine that supplies threads or the like using the hollow portion (space) Sa.

Thus, according to the rotation drive device M according to the first embodiment, the rotation drive device M includes, as a basic configuration, the movable body portion Mm having the rotor yoke 5 formed in a ring shape and a ring-shaped rotor magnet 4 in which a plurality of magnetic poles are arranged along a circumferential direction Ff of an outer peripheral portion 5e of the rotor yoke 5; the fixed body portion Mc in which a plurality of stator core portions 2c, each of which faces an outer peripheral portion Mme of the movable body portion Mm, are arranged in an inner peripheral portion 2i of the stator 2 formed in a ring shape at predetermined intervals along the circumferential direction Ff; and the movable body support portion Ms formed of a plurality of support rollers 6 rotatably supporting the movable body portion Mm by being fixed in position with respect to the stator 2 and bringing a roller peripheral surface 6f into contact with the outer peripheral portion Mme or an inner peripheral portion Mmi of the movable body portion Mm. Thus, the conventional large rolling bearings that rotate the movable body portion Mm can be eliminated. As a result, it is possible to significantly reduce the weight of the movable body portion Mm, reduce the moment of inertia while supporting high torque, and ensure sufficient high-speed responsiveness in the rotation drive device M and improve cost efficiency and energy saving. In addition, the overall structure can be simplified, and in particular, the overall thickness of the device can be reduced. As a result, it is possible to provide a rotation drive device M that is excellent in versatility and expandability, such as being able to sufficiently respond to installation requirements in narrow spaces where the interval is about 10 [mm] or less.

Second Embodiment

Next, a rotation drive device M according to a second embodiment of the present embodiment will be described with reference to FIGS. 8 to 12.

The second embodiment has the same basic configuration as the first embodiment, but differs in that the configuration of the sensor system is added and that the detailed configuration is modified.

Figure 11:
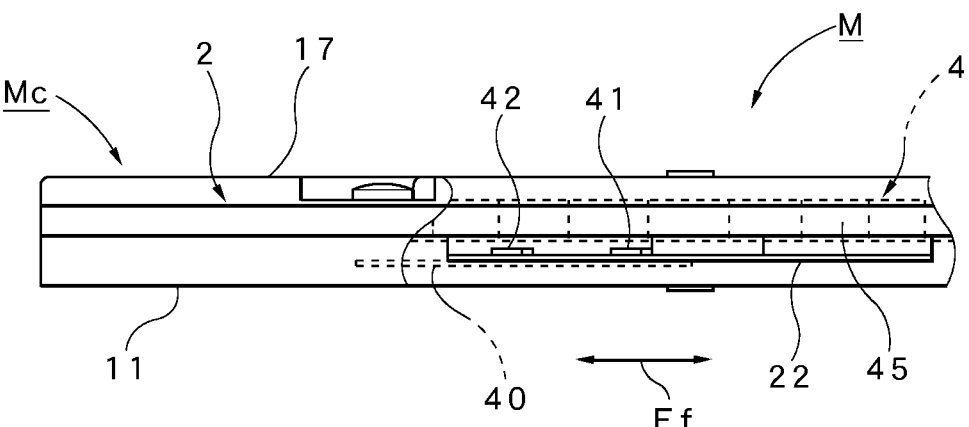
FIG. 11 is a bottom view of the portion shown in FIG. 10 of the rotation drive device.
Figure 12:
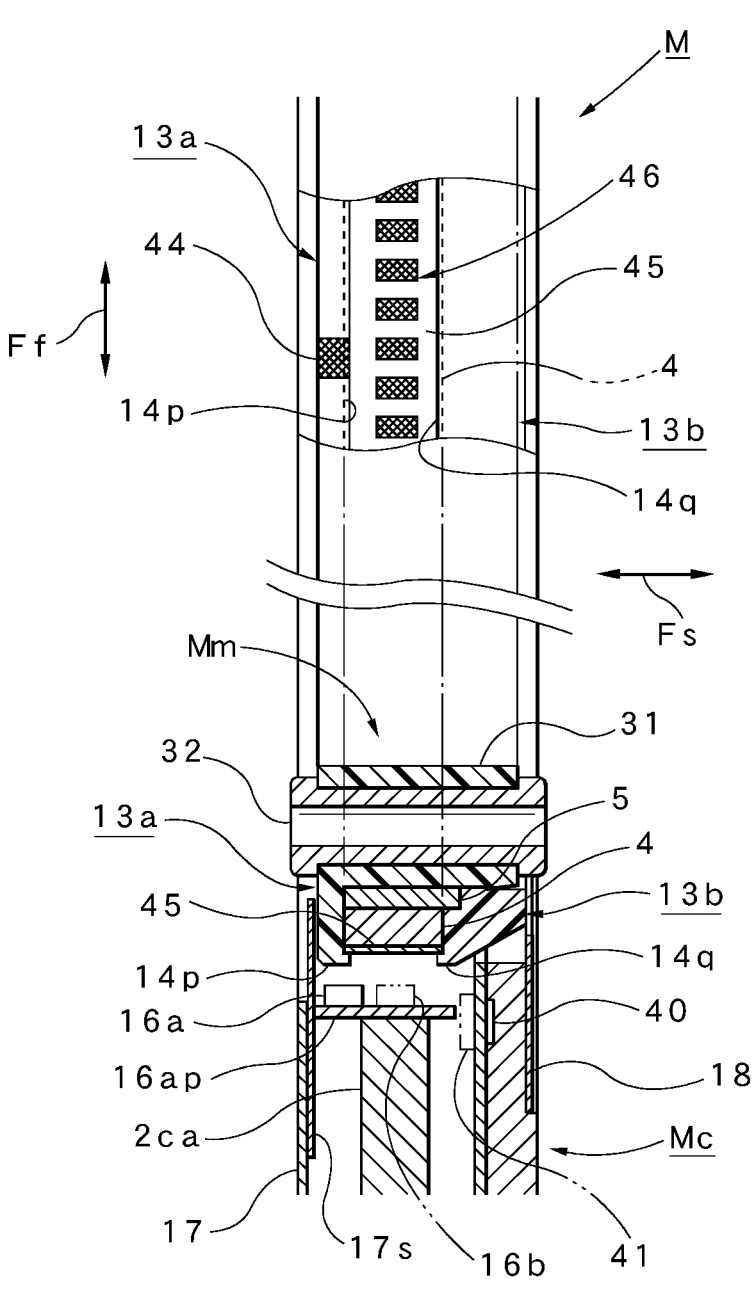
FIG. 12 is an enlarged explanatory view of the rotation drive device within the dashed-dotted line A7 in FIG. 9.

First, as shown in FIGS. 11 and 12, three Hall sensors (Hall ICs) 41, 42, and 43 for detecting the magnetic poles of the rotor magnet 4 are sequentially arranged at predetermined intervals along the direction Ff on the circuit board 22 located near the rotor magnet 4. The Hall sensors 41, 42, and 43 have a function of detecting the magnetic pole position of the rotor magnet 4. Based on this detection result, in the case of the illustrated example, it is possible to perform switching control when the rotation drive device operates as a three-phase DC brushless motor. Reference numeral 40 denotes a sensor yoke. The sensor yoke 40 is used to minimize errors in magnetic pole position detection that occur during normal rotation and reverse rotation in the processing circuits of the Hall sensors 41, 42, and 43. A plate made of a soft magnetic material such as iron is attached to the back side of the circuit board 22.

Further, in the second embodiment, when forming the plurality of stator core portions 2c, some of them are formed as the sensor support portions 2ca and 2cb for supporting the sensors 16a and 16b. In this case, the six accommodation spaces 12 formed in the stator 2 of the first embodiment are changed to three accommodation spaces 12, and the three stator core portions 2c existing in the remaining accommodation spaces 12 are changed to the three sensor attachment portions 2ca, 2cb, and 2cc. In the case of the illustrated example, two sensor attachment portions 2ca and 2cb are used, but in order to ensure the balance of the magnetic circuit, three sensor attachment portions 2ca, 2cb, and 2cc formed in a shape similar to the shape of the stator core portion 2c are provided. Thus, the number of support rollers 6 is changed to three.

A substrate 16ap on which an origin detection sensor 16a is mounted is attached to the tip of one sensor attachment portion 2ca, and a substrate 16bp on which a rotation speed detection sensor 16b is mounted is attached to the tip of the other sensor attachment portion 2cb. In this case, as shown in FIG. 12, when viewed from the side, the origin detection sensor 16a is arranged near the end in the axial direction Fs, and the rotation speed detection sensor 16b is arranged near the center in the axial direction Fs as indicated by the imaginary line in FIG. 12. Both the origin detection sensor 16a and the rotation speed detection sensor 16b use photoreflectors (reflective optical sensors).

In this way, when some of the plurality of stator core portions 2c are formed as sensor support portions 2ca and 2cb for supporting the sensors 16a and 16b, it is not necessary to secure the arrangement location of the sensors 16a and 16b outside the stator 2. Thus, even when various sensors 16a and 16b are provided, it is possible to avoid problems that cause an increase in size and complexity.

On the other hand, as shown in FIG. 12, on the side of the movable body portion Mm, a black mark 44 detected by the origin detection sensor 16a is formed at a predetermined position on the peripheral surface of the tip of the stopper portion 14p. Further, a continuous pattern 46 having 180 pairs of black and white repetitions detected by the rotation speed detection sensor 16b is formed on the outer surface of a ring-shaped sheet guide 45 provided on the outer peripheral surface of the rotor magnet 4. This sheet guide 45 has the same form as the covering sheet portion 15u described above which is formed independently.

In this case, the sheet guide 45 is made of a non-magnetic metal material and is basically a part of the second ring member 13b of the roller guide 13. That is, the covering sheet portion 15u that covers the outer peripheral surface 4e of the rotor magnet 4 is formed thin with a non-magnetic metal material. In this way, when the covering sheet portion 15u is formed by the sheet guide 45 using a non-magnetic metal material, it is possible to support the rotor magnet 4 formed by combining a plurality of single-pole magnets and further enhance the flatness accuracy of the outer peripheral portion Mme of the movable body portion Mm. Thus, it is possible to further stabilize the contact with the support roller 6 and reduce the gap between the stator core portions 2c to increase the magnetic flux density. Thus, when forming the sheet guide 45, it is desirable to make the thickness as thin as possible.

Furthermore, in the second embodiment, reference numeral 32 denotes a yarn guide component formed in a pipe shape with another material (ceramics and the like) with high durability. In the second embodiment, when forming the thread guide 31, the thread guide component 32 is embedded in the first ring member 13a by insert molding or assembling in the portion where a hole is formed.

Reference numeral 47 denotes a roller cover ring made of a resin attached to the peripheral surface 6f of the support roller 6. When such a roller cover ring 47 is used, the sheet guide 45 with which the peripheral surface 6f side of the support roller 6 comes into contact can be made of, for example, a resin material or a metal material different from the forming material of the roller guide 13, which has excellent abrasion resistance to the resin material and has a small expansion coefficient. In addition, it is also possible to reduce the influence of the magnetic circuit.

In addition, in the second embodiment shown in FIGS. 8 to 12, the same reference numerals are given to the same parts and the same functional portions as the first embodiment shown in FIGS. 1 to 6 to clarify the configuration, and the detailed description thereof will be omitted. In such a second embodiment, it is possible to obtain the same effects as those of the first embodiment.

Third Embodiment

Next, a rotation drive device M according to a third embodiment of the present embodiment will be described with reference to FIGS. 13 to 17.

The third embodiment differs from the first and second embodiments in that the number of basic poles is changed, the arrangement position of the movable body support portion Ms (the support roller 6) arranged in the fixed body portion Mc is changed, and specific functional portions Sb and Sc that cause a specific function by rotation are provided inside the inner peripheral portion Mmi of the ring-shaped movable body portion Mm.

Figure 17:
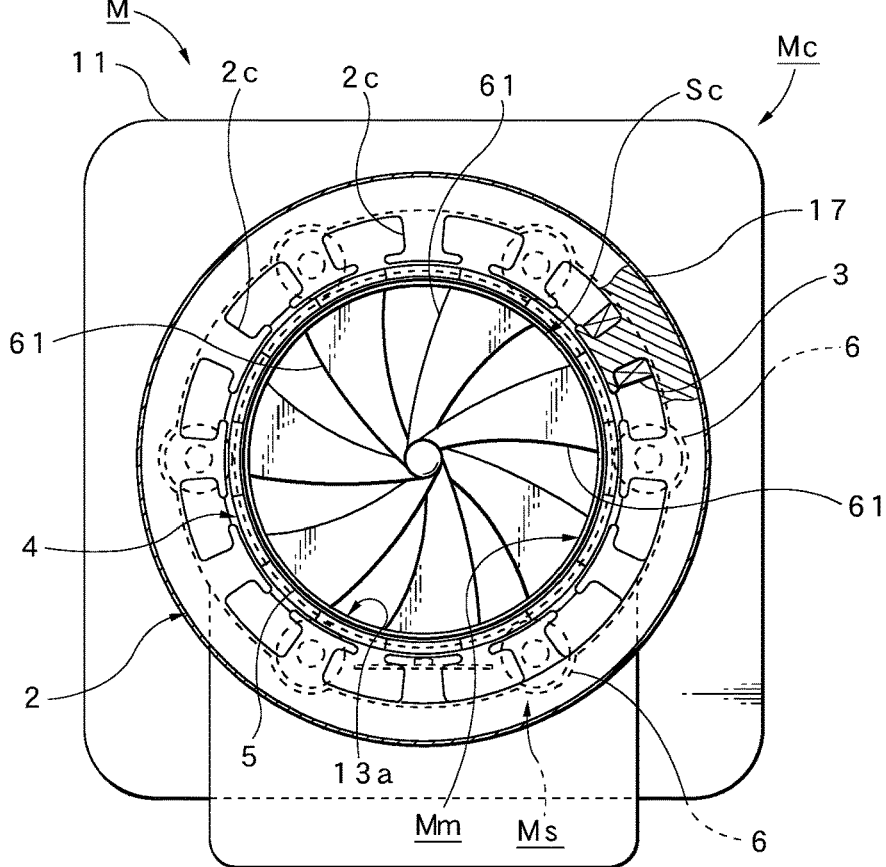
FIG. 17 is a front view showing a modified example of the rotation drive device with the dust-proof cover cut away.

In the third embodiment, as shown in FIG. 17, the number of basic poles is set such that the stator core portion 2c is set to twelve poles and the rotor magnet 4 is set to sixteen poles. Further, in the third embodiment, the accommodation space 12 for accommodating the support rollers 6 is not provided.

Figure 15:
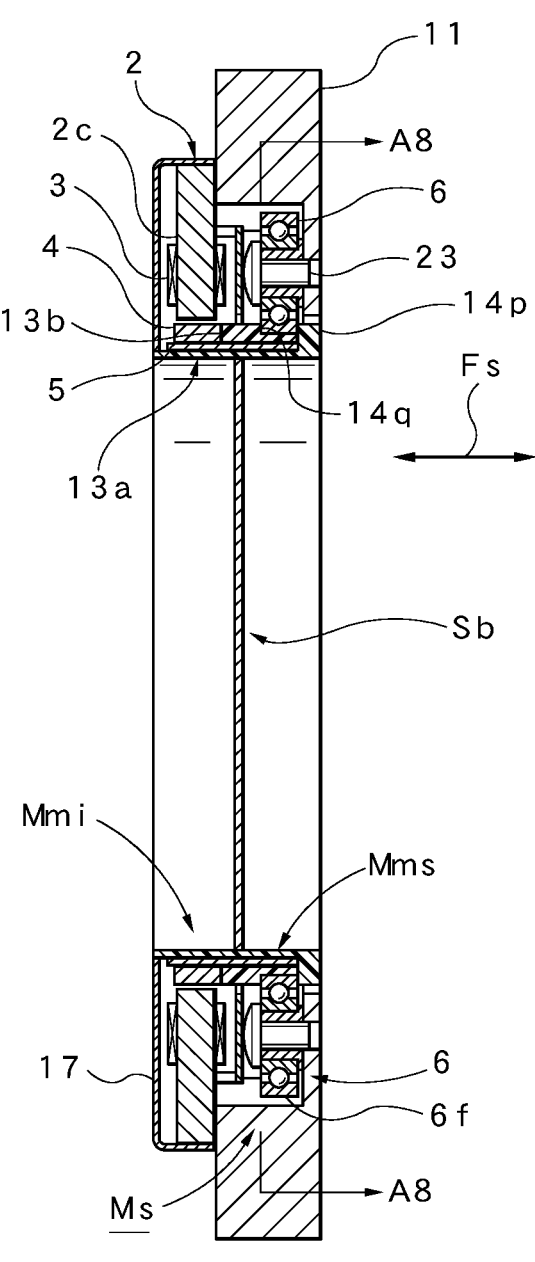
FIG. 15 is a cross-sectional view of the rotation drive device taken along line A9-A9 in FIG. 13.
Figure 16:
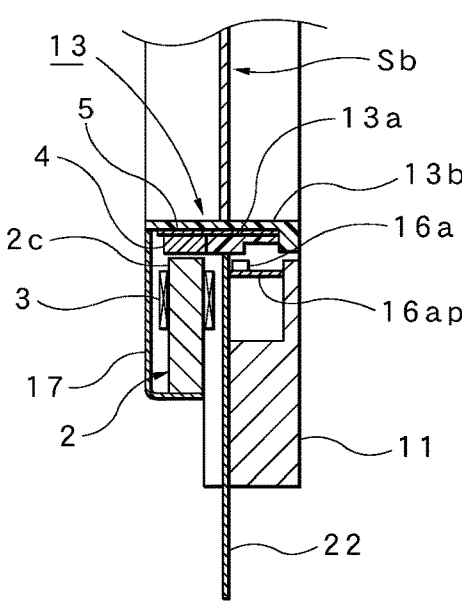
FIG. 16 is a cross-sectional view of the rotation drive device taken along line A10-A10 in FIG. 13.

Furthermore, in the third embodiment, when forming the fixed body portion Mc, as shown in FIG. 15, the arrangement position of the movable body support portion Ms (the support roller 6) in the axial direction Fs is changed. That is, the roller peripheral surface 6f of the support roller 6 disposed on the base portion 11 is brought into contact with the outer peripheral portion Mme of the movable body portion Mm at a position offset in the axial direction Fs with respect to the stator 2. Thus, the support roller 6 and the stator core portion 2c are arranged side by side in the axial direction Fs. With this configuration, the support roller 6 can be brought into contact with the inner peripheral portion Mmi of the movable body portion Mm, or the support rollers 6 can be arranged side by side in the axial direction Fs with respect to the stator 2. In particular, when reduction in the thickness of the rotation drive device M is not required, it is possible to various rotation drive devices M in which various functions are added using the hollow portion.

Therefore, when forming the movable body portion Mm, as shown in FIG. 15, except for the rotor magnet 4 constituting the movable body portion Mm, the rotor yoke 5 and the first ring member 13a are extended in the axial direction Fs, and the position of the second ring member 13b is changed. As a result, a dimension in which the ring-shaped auxiliary body portion Mms is added to the movable body portion Mm of the first embodiment in the axial direction Fs is obtained. In other words, the movable body portion Mm is extended in the axial direction Fs and set to have a width in the axial direction approximately twice that of the movable body portion Mm of the first embodiment. As a result, the roller peripheral surface 6f of the support roller 6 comes into contact with the outer peripheral portion Mme of the auxiliary body portion Mms. With this configuration, as described above, the support rollers 6 can be arranged side by side with respect to the stator 2 in the axial direction Fs. Thus, by increasing the number (number of poles) of stator core portions 2c and stator coils 3, it is possible to improve the performance of the fixed body portion Mc and enhance the stability and smoothness of support for the movable body portion Mm.

Furthermore, in the case of the first embodiment and the second embodiment, when forming the movable body portion Mm, the inside of the inner peripheral portion Mmi of the ring-shaped movable body portion Mm is formed as the hollow portion Sa. However, in the third embodiment, the specific functional portions Sb and Sc which cause specific functions by rotation are provided.

Figure 13:
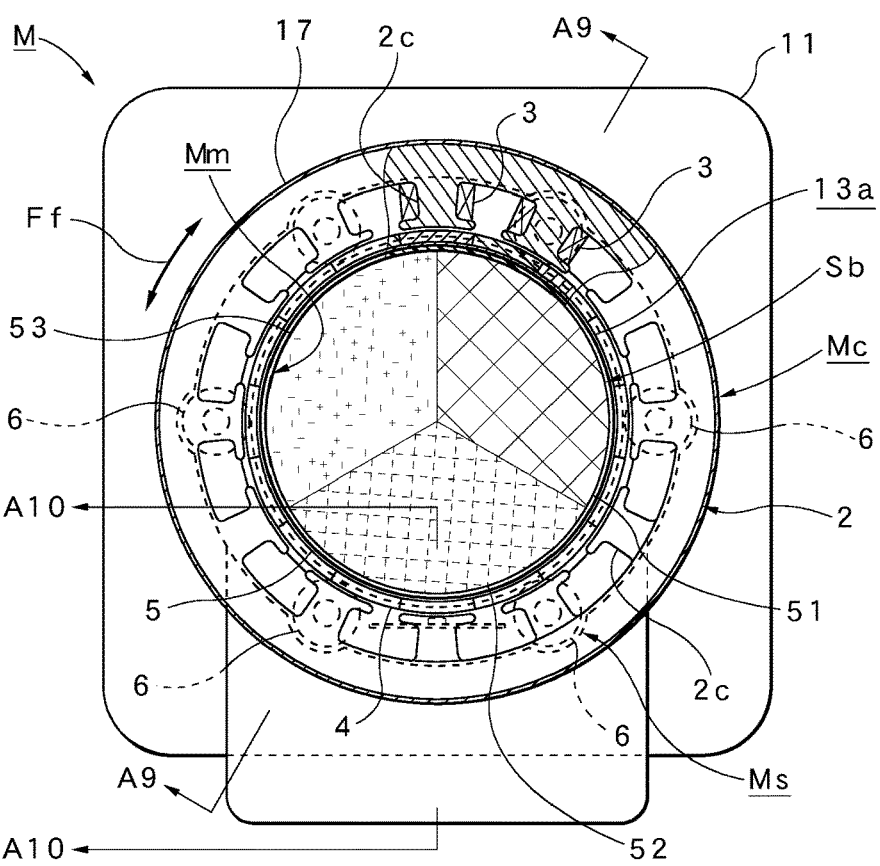
FIG. 13 is a front view including a partial cross-sectional portion of a rotation drive device of a third embodiment according to the preferred embodiment of the present invention, with the dust-proof cover cut away.
Figure 14:
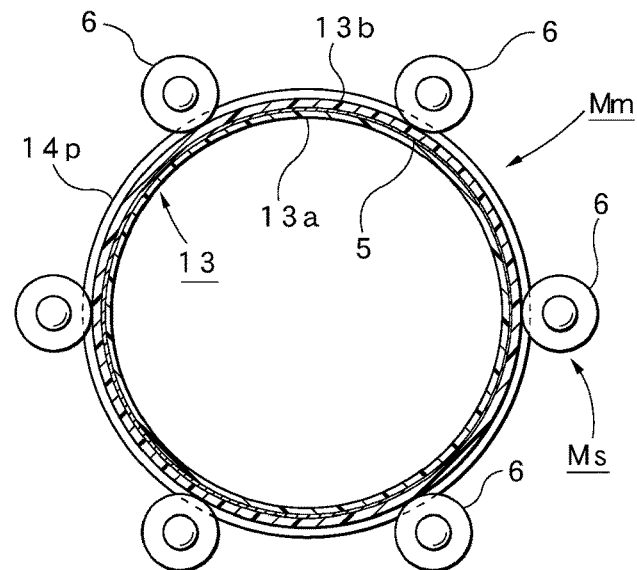
FIG. 14 is a cross-sectional view of a movable body portion in the rotation drive device taken along line A8-A8 in FIG. 15.

FIG. 13 shown as an example shows an arrangement of an RGB color filter (filter functional portion) Sb of an optical device (such as a single-plate projector) that projects color-separated light. A red filter 51, a green filter 52, and a blue filter 53 are sequentially arranged in three regions evenly divided in the circumferential direction Ff. On the other hand, FIG. 17 shown as another example shows a blower fan (blowing functional portion) Sc formed with seven fan blades 61. In this case, since a motor or the like that obstructs air blowing is not present at the center position, air can be efficiently blown into the inside of a relatively thin pipe or the like.

In this manner, when the movable body portion Mm is formed as a specific functional portion Sb or Sc that causes a specific function by rotation inside the inner peripheral portion Mmi, as shown by way of example, it is possible to provide a rotation drive device M that is excellent in versatility and expandability, such as being able to be used and applied to various applications such as RGB color filters of optical devices (single-plate projectors and the like) that project color-separated light and blowers for special purposes.

In addition, in the third embodiment shown in FIGS. 13 to 17, the same reference numerals are given to the same parts and the same functional portions as the first and second embodiments shown in FIGS. 1 to 12 to clarify the configuration, and the detailed description thereof will be omitted.

In this third embodiment, although it is not as good as the first and second embodiments from the viewpoint of thinning, it has the advantage of making it possible to reduce the weight of the movable body portion Mm as in the first embodiment.

Although preferred embodiments (first, second, and third embodiments) have been described in detail above, the present invention is not limited to such embodiments, and detailed configurations, shapes, materials, quantities, numerical values, and the like can be arbitrarily changed, added, or deleted without departing from the scope of the present invention.

For example, the number (number of poles) of stator core portions 2c and the number of poles of the rotor magnet 4 are not limited to the illustrated number (number of poles), and in general, any plural number may be used. Further, the case where the roller peripheral surface 6f is brought into contact with the outer peripheral portion Mme of the movable body portion Mm is shown, but the case where the roller peripheral surface 6f is brought into contact with the inner peripheral portion Mmi of the movable body portion Mm (auxiliary body portion Mms) is not excluded. Further, the case where the roller guide 13 is provided with the covering sheet portions 15d and 15u covering the inner peripheral surface 5i of the rotor yoke 5 and the outer peripheral surface 4e of the rotor magnet 4 is shown, but the case where either one of the covering sheet portions 15d and 15u is provided is not excluded. On the other hand, it is desirable to use the radial bearing 6b as the support roller 6, but it is not intended to exclude the roller function which uses rollers or the like that have a simple structure. On the other hand, the sensor support portions 2ca and 2cb, the dust-proof cover 17 including the dust-proof sheet 17s, and the dust-proof sheet 18 can be replaced with other configurations having similar functions, and are not necessarily essential components.

The rotation drive device according to the present invention can be used for various applications such as an aperture control device, a shutter device (optical control device), and a robot hand device, including an automatic weaving machine, an RGB color filter (optical device), and a blower which has been exemplified, which uses various specific functional portions added to the hollow portion.

The invention claimed is:

1. A rotation drive device comprising:
a fixed body portion having a stator formed in a ring shape and a plurality of stator core portions arranged in an inner peripheral portion of the stator at predetermined intervals along a circumferential direction and a stator coil wound around each of the plurality of stator core portions; and
a movable body portion having a rotor magnet having a plurality of magnetic poles facing the fixed body portion and a rotor yoke attached to the rotor magnet,
wherein the rotor yoke is formed in a ring shape and the plurality of magnetic poles are arranged along a circumferential direction of an outer peripheral portion of the rotor yoke;
wherein each of the plurality of stator core portions faces an outer peripheral portion of the movable body portion; and
a movable body support portion formed of a plurality of support rollers rotatably supporting the movable body portion, the movable body support portion being between the movable body portion and the fixed body portion in a radial direction, wherein the movable body portion includes a roller guide having a stopper portion for restricting relative displacement in an axial direction of the plurality of support rollers.

2. The rotation drive device according to claim 1, wherein the plurality of support rollers uses a radial bearing.

3. The rotation drive device according to claim 2, wherein the radial bearing is entirely or partially made of a non-magnetic material, including at least an outer ring portion.

4. The rotation drive device according to claim 2, wherein the radial bearing is entirely made of a magnetic material.

5. The rotation drive device according to claim 2, wherein the radial bearing is formed by a separate roller cover ring made of a non-magnetic material on an outer peripheral surface thereof.

6. The rotation drive device according to claim 2, wherein the movable body portion includes a roller guide having a stopper portion for restricting relative displacement in an axial direction of the plurality of support rollers.

7. The rotation drive device according to claim 1, wherein the rotor magnet uses an integrally molded magnet that is divided and magnetized into a plurality of poles in the circumferential direction.

8. The rotation drive device according to claim 7, wherein the rotor yoke is formed thinner than the rotor magnet.

9. The rotation drive device according to claim 1, wherein the rotor yoke is formed thinner than the rotor magnet.

10. The rotation drive device according to claim 1, wherein the fixed body portion has a ring-shaped base portion which supports one end surface of the stator and on which the movable body support portion is arranged.

11. The rotation drive device according to claim 10, wherein the fixed body portion is formed by accommodating the plurality of support rollers arranged on the ring-shaped base portion in an accommodation space formed by removing some of the plurality of stator core portions so that a roller peripheral surface of the plurality of support rollers comes into contact with the outer peripheral portion or the inner peripheral portion of the movable body portion.

12. The rotation drive device according to claim 10, wherein the fixed body portion is formed by bringing a roller peripheral surface of the plurality of support rollers arranged on the base portion into contact with the outer peripheral portion or the inner peripheral portion of the movable body portion at a position offset in an axial direction with respect to the stator.

13. The rotation drive device according to claim 12, wherein the movable body portion is integrally provided with a ring-shaped auxiliary body portion extending in the axial direction so that the roller peripheral surface of the plurality of support rollers comes into contact with the outer peripheral portion or the inner peripheral portion.

14. The rotation drive device according to claim 1, wherein the roller guide is entirely or at least partially made of a lubricating synthetic resin material.

15. The rotation drive device according to claim 1, wherein the roller guide has a covering sheet portion covering an inner peripheral surface of the rotor yoke and/or an outer peripheral surface of the rotor magnet.

16. The rotation drive device according to claim 15, wherein the roller guide has a covering sheet portion that covers the outer peripheral surface of the rotor magnet and is made of a non-magnetic metal material.

17. The rotation drive device according to claim 1, wherein some of the plurality of stator core portions are formed as a sensor support portion for supporting a sensor.

18. The rotation drive device according to claim 1, wherein the movable body portion is formed as a hollow portion inside from the inner peripheral portion.

19. The rotation drive device according to claim 1, wherein the movable body portion is formed as a specific functional portion that causes a specific function by rotation inside the inner peripheral portion.

\* \* \* \* \*